United States Patent Office 3,096,359
Patented July 2, 1963

---

3,096,359
BISCHLOROFORMATES OF 2,2,4,4-TETRAALKYL-1,3-CYCLOBUTANEDIOLS
John R. Caldwell and Winston J. Jackson, Jr., Kingsport, Tenn., assignors to Eastman Kodak Company, Rochester, N.Y., a corporation of New Jersey
No Drawing. Filed Apr. 25, 1960, Ser. No. 24,247
6 Claims. (Cl. 260—463)

This invention relates to bischloroformates of 2,2,4,4-tetraalkyl-1,3-cyclobutanediols and process for their preparation.

The new class of compounds of the invention is represented by the following general structural formula:

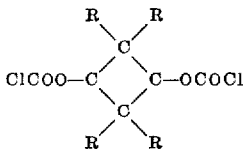

wherein each R represents a straight or branched chain alkyl group of from 1–4 carbon atoms, e.g., methyl, ethyl, propyl, isopropyl, butyl, etc. groups. The new compounds are useful chemical intermediates, for example, for preparing polyurethanes, polycarbonates, synthetic lubricants and plasticizers with high hydrolytic stability.

It is, accordingly, an object of the invention to provide a new class of alicyclic bischloroformates. Another object is to provide derivatives thereof. Another object is to provide means for preparing the above compounds. Other objects will become apparent hereinafter.

In accordance with the invention, we prepare our new alicyclic bischloroformates by suspending a 2,2,4,4-tetraalkyl-1,3-cyclobutanediol in a solvent medium, e.g., dry dioxane, adding an excess of phosgene, i.e., an amount greater than the stoichiometrically calculated quantity, and then heating the reaction mixture at about from 40–60° C., for several hours under a reflux condenser containing Dry Ice and acetone. After dry air is passed in to drive out the evolved hydrogen chloride and excess phosgene, the solvent is removed under reduced pressure. If desired, the residual bischloroformate can be used directly as an intermediate without further purification. Where a product of higher purity is required, the crude bischloroformate can be recrystallized from a hydrocarbon solvent such as hexane. The cis and trans isomers can also be separated by this means. The reaction takes place according to the following scheme:

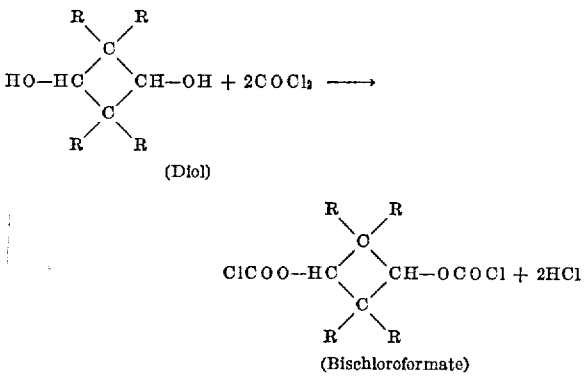

wherein R in each instance is as previously defined. While the reaction can be carried out, if desired, in proportions of just 2 moles of phosgene per mole of the diol as illustrated in the above reaction, advantageously more than 2 moles, or even more, of the phosgene is employed per mole of the doil. The reaction can be carried out at reduced or at higher pressures than atmospheric, but preferably under atmospheric pressure conditions. Suitable diols for carrying out the process of the invention come within the diol formula of the above reaction, of which 2,2,4,4-tetramethyl-1,3-cyclobutanediol,
2,2,4,4-tetraethyl-1,3-cyclobutanediol,
2,2,4,4-tetrapropyl-1,3-cyclobutanediol,
2,2,4,4-tetraisopropyl-1,3-cyclobutanediol,
2,2,4,4-tetrabutyl-1,3-cyclobutanediol,
2,2-dimethyl-4,4-diethyl-1,3-cyclobutanediol,
2,4-dimethyl-2,4-diethyl-1,3-cyclobutanediol, etc.

are representative. These diol compounds can be prepared as described in copending application of Robert H. Hasek and Edward U. Elam, Serial No. 728,083, filed April 14, 1958 (now U.S. Patent No. 2,936,324, dated May 10, 1960).

The following examples will serve to illustrate further our new bischloroformates, the manner of their preparation and uses thereof.

*Example 1.—2,2,4,4-Tetramethyl-1,3-Cyclobutanediol Bischloroformate*

A mixture containing 72 g. (0.50 mol) of 2,2,4,4-tetramethyl-1,3-cyclobutanediol and 300 ml. of dry dioxane (distilled over sodium) was stirred while 216 g. of phosgene was added. A condenser filled with Dry Ice and acetone was attached to the flask, and the mixture was stirred at 50° C. for 10 hr. while the phosgene refluxed. Dry air was then passed into the solution at 40–50° C. to drive off the hydrogen chloride and phosgene (led to a water trap). The solvent was removed at 50° C. with a water aspirator while the solution was rotated in a rotary evaporator. The crude product was used to prepare polyurethanes, polycarbonates, synthetic lubricants, and plasticizers. A portion of the product, recrystallized from an equal amount of hexane, melted at 85–88° C. This isomer was used to prepare polyurethanes and polycarbonates.

*Analysis.*—Calcd. for $C_{10}H_{14}Cl_2O_4$: C, 44.7; H, 5.2; Cl, 26.4. Found: C, 44.61; H, 5.36; Cl, 62.28.

*Example 2.—2,4-Diethyl-2,4-Dimethyl-1,3-Cyclobutanediol Bischloroformate*

This compound was prepared from the corresponding 2,2-diethyl-2,4-dimethyl-1,3-cyclobutanediol by the procedure of Example 1. The isomers were not separated.
The product was an oil.

*Analysis.*—Calcd. for $C_{12}H_{18}Cl_2O_4$: C, 48.5; H, 6.1; Cl, 23.9. Found: C, 4.83; H, 6.3; Cl, 23.8.

*Example 3.—2,4-Dibutyl-2,4-Dimethyl-1,3-Cyclobutanediol Bischloroformate*

This compound was prepared from the corresponding 2,2-dibutyl-2,4-dimethyl-1,3-cyclobutanediol by the procedure of Example 1. The isomers were not separated and were used in this mixed form to prepare polyurethanes.

*Analysis.*—Calcd. for $C_{16}H_{20}Cl_2O_4$: C, 54.4; H, 7.4; Cl, 20.1. Found: C, 54.6; H, 7.5; Cl, 20.0.

Other of the bischloroformates of 2,2,4,4-tetraalkyl-1,3-cyclobutanediols coming within the definition of the invention can be prepared by following the procedure of Example 1, for example, 2,2,4,4-tetrapropyl-1,3-cyclobutanediol gives 2,2,4,4-tetrapropyl-1,3-cyclobutanediol bischloroformate, 2,2,4,4-tetrabutyl-1,3-cyclobutanediol gives 2,2,4,4 - tetrabutyl-1,3-cyclobutanediol bischloroformate, etc. The preparation of polyurethanes from the bischloroformates of the invention and diamines is described in copending application of James C. Martin and Edward U. Elam, Serial No. 4,185, filed January 25, 1960. Polycarbonates may be prepared by adding the bischloroformates to bisphenols in mixtures containing aqueous sodium hydroxide and methylene chloride. Synthetic lubricants and plasticizers may be prepared by adding 2 moles of a carbinol to 1 mole of the bischloroformate in the presence of pyridine. The polymers and esters obtained are characterized by high hydrolytic stability.

What we claim is:

1. The compounds represented by the following general structural formula:

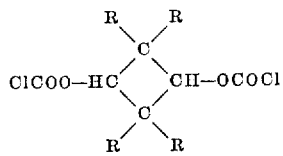

wherein each R represents an alkyl group containing from 1-4 carbon atoms.

2. 2,2,4,4 - tetramethyl-1,3-cyclobutanediol bischloroformate.

3. A mixture of cis and trans 2,4-diethyl-2,4-dimethyl-1,3-cyclobutanediol bischloroformate.

4. A mixture of cis and trans 2,4-dibutyl-2,4-diethyl-1,3-cyclobutanediol bischloroformate.

5. A mixture of cis and trans 2,2,4,4-tetrapropyl-1,3-cyclobutanediol bischloroformate.

6. A mixture of cis and trans 2,2,4,4-tetrabutyl-1,3-cyclobutanediol bischloroformate.

References Cited in the file of this patent

UNITED STATES PATENTS

| | | |
|---|---|---|
| 2,923,732 | Norton | Feb. 2, 1960 |
| 2,936,324 | Hasek et al. | May 10, 1960 |

UNITED STATES PATENT OFFICE

CERTIFICATE OF CORRECTION

Patent No. 3,096,359                          July 2, 1963

John R. Caldwell et al.

It is hereby certified that error appears in the above numbered patent requiring correction and that the said Letters Patent should read as corrected below.

Column 2, line 41, for "Cl, 62.28." read -- Cl, 26.28. --.

Signed and sealed this 14th day of January 1964.

(SEAL)
Attest:

ERNEST W. SWIDER
Attesting Officer

EDWIN L. REYNOLDS
Acting Commissioner of Patents